US008579757B2

(12) United States Patent
Sakagami et al.

(10) Patent No.: US 8,579,757 B2
(45) Date of Patent: Nov. 12, 2013

(54) ROLLER FRICTIONAL TRANSMISSION UNIT

(75) Inventors: Eigo Sakagami, Kawasaki (JP); Tetsu Takaishi, Chigasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 163 days.

(21) Appl. No.: 13/309,635

(22) Filed: Dec. 2, 2011

(65) Prior Publication Data

US 2012/0149529 A1 Jun. 14, 2012

(30) Foreign Application Priority Data

Dec. 9, 2010 (JP) .................................. 2010-274249

(51) Int. Cl.
*B04B 1/04* (2006.01)

(52) U.S. Cl.
USPC ................. 476/67; 476/73; 701/69; 180/248; 475/165

(58) Field of Classification Search
USPC ........... 476/67, 73; 701/69, 89; 180/248, 249, 180/197; 475/165
See application file for complete search history.

(56) References Cited

U.S. PATENT DOCUMENTS

| 4,322,798 | A  | * | 3/1982  | McCoin ........................... 701/51 |
| 4,555,963 | A  | * | 12/1985 | Nelson ........................... 475/195 |
| 6,840,886 | B2 | * | 1/2005  | Ohara .............................. 476/67 |
| 6,849,025 | B2 | * | 2/2005  | Chikaraishi et al. ............ 476/21 |
| 6,997,848 | B1 | * | 2/2006  | Cillessen et al. ................ 476/55 |
| 7,118,512 | B2 | * | 10/2006 | Flugrad et al. .................. 476/33 |
| 7,575,535 | B2 | * | 8/2009  | Yamamoto ...................... 476/42 |
| 7,780,569 | B2 | * | 8/2010  | Nakazeki ........................ 476/53 |
| 8,057,353 | B2 | * | 11/2011 | Yamamoto ...................... 476/59 |
| 8,075,444 | B2 | * | 12/2011 | Yamamoto ...................... 476/61 |
| 2010/0276246 | A1 |   | 11/2010 | Mori et al. |

FOREIGN PATENT DOCUMENTS

| EP | 2 236 341 A1 | 10/2010 |
| JP | 2009-173261 A | 8/2009 |

* cited by examiner

*Primary Examiner* — David M Fenstermacher
(74) *Attorney, Agent, or Firm* — Foley & Lardner LLP

(57) ABSTRACT

A roller frictional transmission unit includes: a first roller; a second roller; an input shaft connected with a driving system of main driving wheels, and connected with one of the first roller and the second roller; an output shaft connected with a driving system of auxiliary driving wheels, and connected with the other of the first roller and the second roller; a thrust bearing arranged to position an input shaft side rotation section including the one of the first roller and the second roller and the input shaft, or an output shaft side rotation section including the other of the first roller and the second roller and the output shaft, with respect to a unit housing in an axial direction; and a low rigidity structure disposed in a thrust transmission path to the thrust bearing, and arranged to buffer a thrust.

5 Claims, 5 Drawing Sheets

ROLLER FRICTIONAL TRANSMISSION UNIT

BACKGROUND OF THE INVENTION

This invention relates to a roller frictional transmission unit used as a transfer of a four wheel drive vehicle, and more specifically to an art to improve a durability of a thrust bearing arranged to position a roller of the transmission unit in an axial direction.

U.S. Patent Application Publication No. 2010/0276246 A1 (corresponding to Japanese Patent Application Publication No. 2009-173261) discloses a roller frictional transmission unit including a pair of rollers. In this roller frictional transmission unit, outer circumference surfaces of the rollers are pressed and contacted with each other in a radial direction so as to transmit power between the rollers by the friction. One of the rollers is connected with an input shaft connected with a driving system of main driving wheels of a four wheel drive vehicle. Other of the rollers is connected with a driving system of auxiliary driving wheels of the four wheel driving vehicle.

In the roller frictional transmission unit, each of the rollers is positioned by thrust bearings disposed on both sides in an axial direction, with respect to a housing of the roller frictional transmission unit in the axial direction, so as to stably perform the frictional contact between the rollers.

SUMMARY OF THE INVENTION

In the roller frictional transmission unit, when the rollers are pressed and contacted with each other in the radial direction, the shafts of the rollers (the input shaft and the output shaft) are curved in a direction to be away from each other within a bearing span. Accordingly, side walls of the unit housing supporting the shafts are deformed so that central portions of the unit housing side walls between the shafts are moved closer to each other, and so that both end portions of the unit housing side walls to sandwich the central portion of the unit housing side walls between the shafts are moved to be away from each other.

This deformation of the unit housing limits thrust load distribution of the thrust bearings arranged to position the rollers in the axial direction, to extreme small circumferential regions of the thrust bearings confronting the unit housing side wall central portions which approach each other as described above.

Accordingly, each of the thrust bearings receives the biased thrust load only at the extreme small circumferential region. Therefore, the durability of the thrust bearing is deteriorated by the large contact pressure.

It is, therefore, an object of the present invention to provide a roller frictional transmission unit arranged to increase an area of a circumferential region to which the thrust load is applied relative to a conventional apparatus when a side wall of a unit housing is deformed, to decrease a contact pressure of a thrust bearing by a thrust load, and to solve the above mentioned problem of the durability of the thrust bearing.

According to one aspect of the present invention, A roller frictional transmission unit comprises: a first roller; a second roller having an outer circumference surface arranged to be pressed and contacted with an outer circumference surface of the first roller to transmit a power between the first roller and the second roller by a friction; an input shaft connected with a driving system of main driving wheels of a four wheel drive vehicle, and connected with one of the first roller and the second roller; an output shaft connected with a driving system of auxiliary driving wheels of the four wheel drive vehicle, and connected with the other of the first roller and the second roller; a thrust bearing arranged to position an input shaft side rotation section including the one of the first roller and the second roller and the input shaft, or an output shaft side rotation section including the other of the first roller and the second roller and the output shaft, with respect to a unit housing in an axial direction; and a low rigidity structure disposed in a thrust transmission path to the thrust bearing, and arranged to buffer a thrust.

BRIEF DESCRIPTION OF THE DRAWINGS

FIGS. 4A and 4B are illustrative views when a unit housing of the roller frictional transmission unit of FIG. 3 is deformed by a radial pressing reaction force between rollers.

FIGS. 5A and 5B are schematic illustrative views when a unit housing of the roller frictional transmission unit of FIG. 2 is deformed by a radial pressing reaction force between rollers.

FIGS. 7A and 7B are schematic illustrative views when a unit housing of the roller frictional transmission unit of FIG. 6 is deformed by a radial pressing reaction force between rollers. FIG. 7A is a schematic illustrative view showing the roller frictional transmission unit of FIG. 6. FIG. 7B is a schematic illustrative view showing thrust load distribution to thrust bearings at the deformation of the unit housing.

DETAILED DESCRIPTION OF THE INVENTION

Hereinafter, roller frictional transmission units 1 according to embodiments of the present invention are illustrated with reference to drawings.

<Structure According to First Embodiment>

Figure 1:
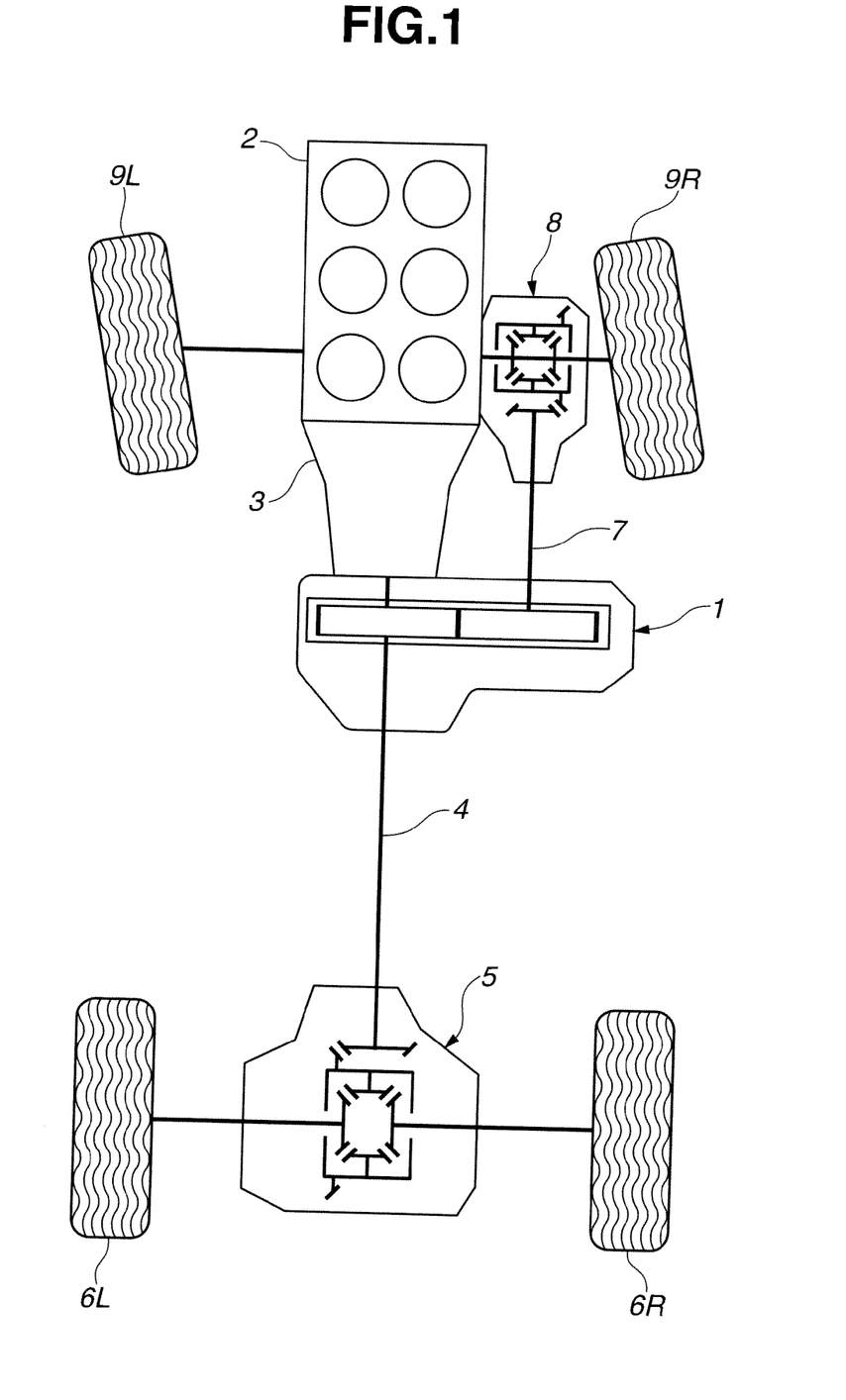
FIG. 1 is a schematic plan view from above a four wheel drive vehicle, showing a power train of the four wheel drive vehicle which is provided, as a transfer, with a roller frictional transmission unit according to a first embodiment of the present invention.

FIG. 1 is a schematic plan view from above a four wheel drive vehicle, showing a power train of the four wheel drive vehicle which is provided, as a transfer, with a roller frictional transmission unit 1 according to a first embodiment of the present invention.

The four wheel drive vehicle of FIG. 1 is based on a rear wheel drive vehicle in which rotation from an engine 2 is shifted by a transmission 3, and then transmitted through a rear propeller shaft 4 and a rear final drive unit 5 to left and right rear wheels 6L and 6R, and constructed so that a part of torque to left and right rear wheels (main driving wheels) 6L and 6R is transmitted by roller frictional transmission unit 1 through a front propeller shaft 7 and a front final drive unit 8 to left and right front wheels (auxiliary driving wheels) 9L and 9R, thus achieving four wheel driving.

Roller frictional transmission unit 1 is thus configured to split and output a part of torque to left and right rear wheels (the main driving wheels) 6L and 6R, to left and right front wheels (the auxiliary driving wheels) 9L and 9R, and thereby to set driving force distribution ratio between left and right rear wheels (the main driving wheels) 6L and 6R, and left and right front wheels (the auxiliary driving wheels) 9L and 9R. In this embodiment, roller frictional transmission unit 1 is constructed as shown in FIG. 2.

Figure 2:
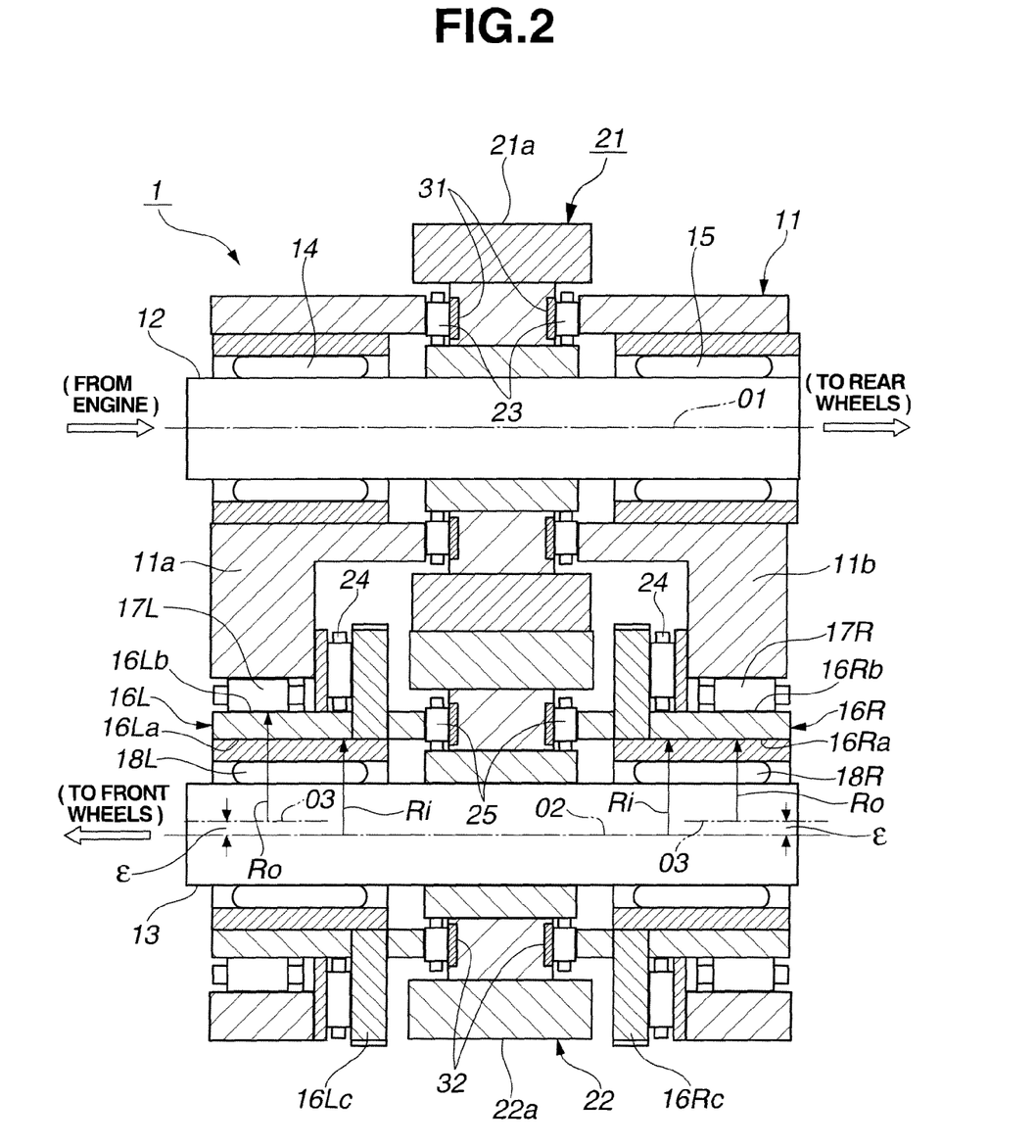
FIG. 2 is a longitudinal sectional side view showing the roller frictional transmission unit of FIG. 1.

In FIG. 2, a numeral 11 is a unit housing. An input shaft 12 and an output shaft 13 are disposed within unit housing 11 so that a rotational axis 01 of input shaft 12 and a rotational axis 02 of output shaft 13 are parallel with each other to laterally cross within unit housing 11. Input shaft 12 is rotatably supported by radial bearings 14 and 15 on side walls 11a and 11b of unit housing 11 so that input shaft 12 freely rotates about axis 01. Input shaft 12 includes both ends protruding from unit housing 11. The left end of input shaft 12 in FIG. 2 is connected through transmission 3 (cf. FIG. 1) to engine 2. The right end of input shaft 12 in FIG. 2 is connected through rear propeller shaft 4 (cf. FIG. 1) to rear final drive unit 5.

Output shaft 13 is rotatably supported at both ends of output shaft 13 on side walls 11a and 11b of unit housing 11 by the following support structure. Crank shafts 16L and 16R of a hollow outer shaft type are freely mounted, respectively, between output shaft 13 and unit housing side walls 11a and 11b through which the both ends of output shaft 13 penetrate. These crank shafts 16L and 16R have the same specification.

A radial bearing 17L is disposed between crank shaft 16L and unit housing side walls 11a and 11b. With this, crank shaft 16L is rotatably supported on an outer circumference surface 16Lb of crank shaft 16 by unit housing side walls 11a and 11b. Moreover, a radial bearing 17R is disposed between crank shaft 16R and unit housing side walls 11a and 11b. With this, crank shaft 16R is rotatably supported on an outer circumference surface 16Rb of crank shaft 16R by unit housing side walls 11a and 11b.

A radial bearing 18L is disposed between crank shaft 16L and output shaft 13. With this, output shaft 13 is rotatably supported on an outer circumference surface of output shaft 13 within a hollow hole 16La of crank shaft 16L. A radial bearing 18R is disposed between crank shaft 16R and output shaft 13. With this, output shaft 13 is rotatably supported on the outer circumference surface of output shaft 13 within a hollow hole 16Ra of crank shaft 16R. Accordingly, output shaft 13 freely rotates about an axis 02 within hollow holes 16La and 16Ra of crank shaft 16L and 16R.

By the above-described structure, the both ends of output shaft 13 are rotatably supported, respectively, through crank shafts 16L and 16R within unit housing side walls 11a and 11b. Output shaft 13 supported within unit housing 11 includes a left end in FIG. 2 which protrudes from unit housing 11, and which is connected with front propeller shaft 7 (cf. FIG. 1). With this, the left end of output shaft 13 is connected with left and right front wheels 9L and 9R through front propeller shaft 7 and front final drive unit 8.

Input shaft 12 is connected or molded integrally with a first roller 21 which is disposed at a substantially central portion of input shaft 12. Output shaft 13 is connected or molded integrally with a second roller 22 which is disposed at a substantially central portion of output shaft 13. First roller 21 and second roller 22 are disposed on the same plane perpendicular to the axes. Thrust bearings 23 are disposed, respectively, between unit housing side walls 11a and 11b, and the both sides of first roller 21 in the axial direction. Thrust bearings 23 position first roller 21 and input shaft 12 in the axial direction.

A center 03 of outer circumference surfaces 16Lb and 16Rb (radius Ro) of crank shafts 16L and 16R are off (eccentric) from center 02 of crank shaft hollow holes 16La and 16Ra (radius Ri) by E. With this, rotational axis 02 of output shaft 13 and second roller 22 rotates around rotational axis 03 by rotating crank shafts 16L and 16R around rotational axis 03 relative to unit housing 11. Consequently, it is possible to increase or decrease a radial pressing force of second roller 22 (outer circumference surface 22a) against first roller 21 (outer circumference surface 21a), and thereby to control contact frictional force (transmission torque capacity) between first roller 21 and second roller 22.

Ring gears 16Lc and 16Rc having the same specification are integrally provided on adjacent ends of crank shafts 16L and 16R which confront each other, so as to perform the above-described rotational position control around rotational axis 03 of crank shafts 16L and 16R. These ring gears 16Lc and 16Rc are engaged with a common crank shaft drive pinion (not shown) having the same specification. This crank shaft drive pinion is connected with an inter-roller radial pressing force control motor.

Ring gears 16Lc and 16Rc are engaged with the crank shaft drive pinion (not shown) so that crank shafts 16L and 16R are positioned in rotational positions in which eccentric outer circumference surfaces 16Lb and 16Rb of crank shafts 16L and 16R are arranged in the circumferential direction so as to be the same phase.

Thrust bearings 24 are disposed, respectively, between ring gears 16Lc and 16Rc, and unit housing side walls 11a and 11b. Thrust bearings 25 are disposed, respectively, between second roller 22, and crank shafts 16L and 16R. These thrust bearings 24 and 25 position crank shafts 16L and 16R and second roller 22 (output shaft 13) with respect to unit housing 11 in the axial direction.

<Driving Force Distribution Operation> The driving force distribution operation of the roller frictional transmission unit shown in FIGS. 1 and 2 according to the first embodiment is illustrated below.

The output torque from transmission 3 in FIG. 1 is inputted into input shaft 12 from the left end in FIG. 2. This output torque is transmitted directly through rear propeller shaft 4 and rear final drive unit 5 to left and right rear wheels 6L and 6R (the main driving wheels).

On the other hand, roller frictional transmission unit 1 transmits a part of the torque to left and right rear wheels 6L and 6R from first roller 21 through second roller 22 to output shaft 13. The torque transmitted to output shaft 13 is transmitted from the left end of output shaft 13 in FIG. 2 through front propeller shaft 7 (cf. FIG. 1) and front final drive unit 8 to left and right front wheels (the auxiliary driving wheels) 9L and 9R.

In this way, the vehicle can perform the four wheel driving by driving all of left and right rear wheels 6L and 6R (the main driving wheels) and left and right front wheels 9L and 9R (the auxiliary driving wheels). The driving force distribution control between left and right rear wheels 6L and 6R and left and right front wheels 9L and 9R at the four wheel driving is performed by rotating crank shafts 16L and 16R around axis 03 through ring gears 16Lc and 16Rc by the above-described inter-roller radial pressing force control motor (not shown). This control operation is performed in the following manner.

Rotational axis 02 of output shaft 13 and second roller 22 is rotated around axis 03 by the rotation of crank shafts 16L and 16R around axis 03. With this, the radial pressing force of second roller 22 against first roller 21, that is, the transmission torque capacity (the front and rear wheel driving force distribution) between rollers 21 and 22 is arbitrarily controlled by varying a distance between the axes of rollers 21 and 22, so that the driving force distribution control between left and right rear wheels 6L and 6R and left and right front wheels 9L and 9R is performed.

<Unit Housing Deformation and its Problem>

In the roller frictional transmission unit shown in FIG. 2, housing 11 is elastically deformed when rollers 21 and 22 are pressed and contacted with each other in the radial direction, as described below.

Figure 3:
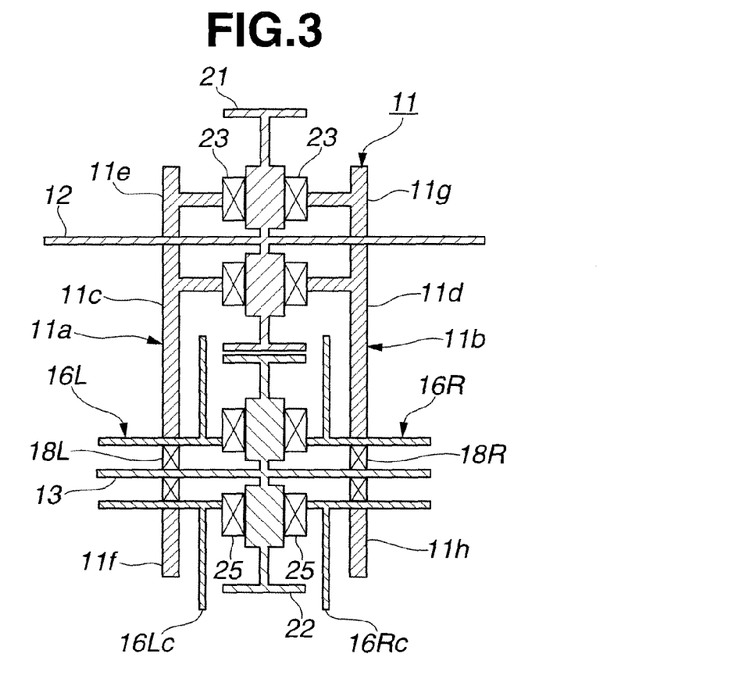
FIG. 3 is a schematic view showing the roller frictional transmission unit of FIG. 2, in a state in which a main structure according to the present invention is removed.

FIG. 3 shows a schematic view showing the roller frictional transmission unit of FIG. 2. When rollers 21 and 22 are pressed and contacted with each other in the radial direction, input shaft 12 of roller 21 and output shaft 13 of roller 22 are brought from a straight state of FIG. 3 to a curved state of FIG. 4 that input shaft 12 and output shaft 13 are away from each other, respectively, in a bearing span between radial bearings 14 and 15 (cf. FIG. 2), and in a bearing span between radial bearings 17L and 17R (cf. FIG. 2).

Figure 4A:
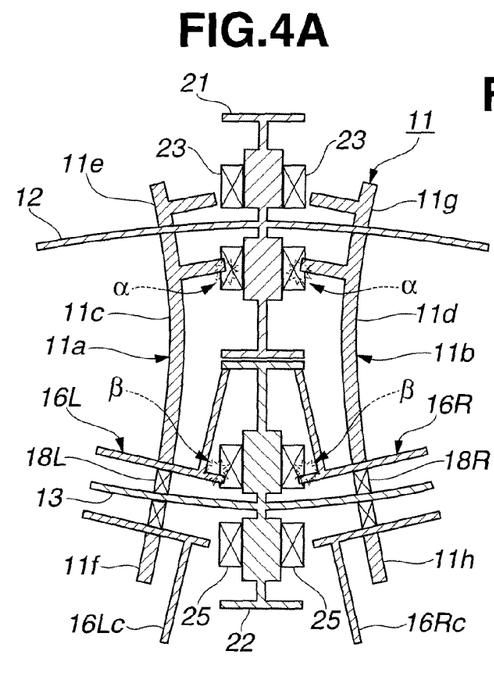
FIG. 4A is an illustrative view showing a deformation state of the unit housing.

As shown in FIG. 4A, side walls 11a and 11b of unit housing 11 supporting these shafts 12 and 13 are deformed by the curvatures of input shaft 12 and output shaft 13 so that central portions 11c and 11d of unit housing side walls 11a and 11b between shafts 12 and 13 are moved closer to each other, and so that unit housing side wall both end portions 11e and 11f, and 11g and 11h which are on both sides of unit housing side wall central portions 11c and 11d are moved away from each other.

By the approach of unit housing side wall central portions 11c and 11d, each of thrust bearings 23 positioning roller 21 receives a thrust load only in a circumferential region confronting one of unit housing side wall central portions 11c and 11d as shown by a in FIG. 4A, and each of thrust bearings 25 positioning roller 22 receives a thrust load only in a circumferential region confronting one of unit housing side wall central portions 11c and 11d as shown by β in FIG. 4A.

Moreover, all of thrust transmission (transmitting) paths have high rigidity. Accordingly, the thrust load distribution to thrust bearings 23 and 25 are limited to extremely small regions of the above-described circumference region as shown by γ and δ in FIG. 4B. Accordingly, thrust bearings 23 and 25 receive the biased thrust load only in the extremely small circumferential regions. Therefore, the durability of thrust bearings 23 and 25 may be deteriorated by the large contact pressures.

For dissolving this problem, it is conceivable that shaft diameters of input shaft 12 and output shaft 13 are increased so as to suppress the curvatures of input shaft 12 and output shaft 13 which cause the above-described problem, and that thicknesses of unit housing side walls 11a and 11b are increased so as to suppress the deformations of unit housing side walls 11a and 11b. However, these countermeasures cause the large weight increase, and the cost increase. Accordingly, the countermeasure which does not cause the weight increase and the cost increase has been required.

<Countermeasure for Durability of Thrust Bearing>

The roller frictional transmission unit according to the first embodiment has a below-described structure for solving the above-described problems relating to the durability of the thrust bearing without the weight increase and the cost increase.

Figure 5A:
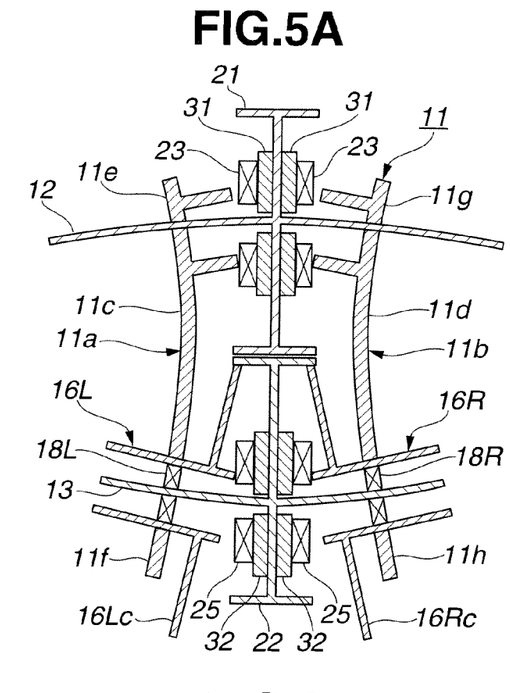
FIG. 5A is a schematic illustrative view showing the roller frictional transmission unit of FIG. 2 in a deformed state of the unit housing.

That is, as shown in FIG. 2 and FIG. 5A, thrust buffering members 31 such as an elastic member are disposed, respectively, in thrust direction abutting portions between thrust bearings 23 and first roller 21, in which thrust bearings 23 and first roller 21 confront each other in the thrust direction. With this, low rigidity structures for buffering the thrust are disposed, respectively, in the thrust transmissions path to thrust bearing 23. Moreover, thrust buffering members 32 such as the elastic member are disposed, respectively, in thrust direction abutting portions between thrust bearings 25 and second roller 22, in which thrust bearings 25 and second roller 22 confront each other in the thrust direction. With this, the low rigidity structures for buffering the thrust are disposed, respectively, in the thrust transmission paths to thrust bearings 25.

<Operations and Effects of First Embodiment>

Figure 4B:
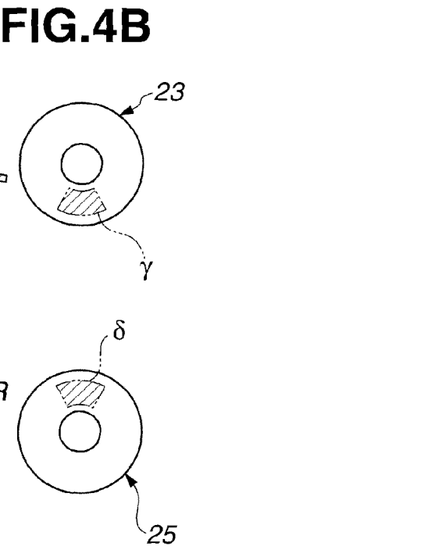
FIG. 4B is an illustrative view showing thrust load distribution to thrust bearings at the deformation of the unit housing.
Figure 5B:
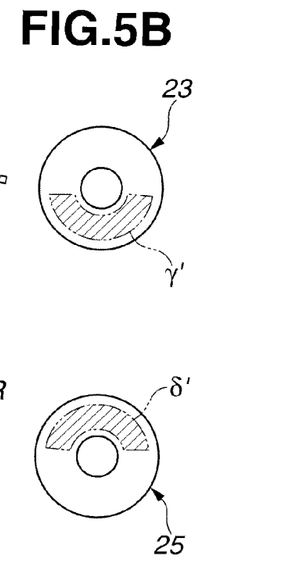
FIG. 5B is a schematic illustrative view showing thrust load distribution to thrust bearings at the deformation of the unit housing.

In the roller frictional transmission unit according to the first embodiment, even when unit housing side walls 11a and 11b are deformed as shown in FIG. 5A by the cause described above with reference to FIG. 4A, the thrust load to thrust bearings 23 and 25 are buffered and dispersed by thrust buffering members 31 and 32 (the low rigidity structures for buffering the thrust). The areas of the circumference regions of thrust bearings 23 and 25 to which the thrust load are applied are γ' and δ' as shown in FIG. 5B, and are not the small areas γ and δ of the conventional apparatus as shown in FIG. 4B.

Accordingly, it is possible to decrease the contact pressures of thrust bearings 23 and 25 by the thrust load relative to the conventional apparatus, and to improve the durability of thrust bearings 23 and 25. Moreover, it is possible to attain the above-described effects without the weight increase and the cost increase of the roller frictional transmission unit since thrust buffering members 31 and 32 such as the light-weight and low-cost elastic member are merely provided.

Moreover, it is possible to increase the radial pressing force between the rollers without worrying about the durability of thrust bearings 23 and 25, thereby to increase the transmission torque capacity of the roller frictional transmission unit, and to improve the running performance of the four wheel drive vehicle on rough road (running through performance). Moreover, when the large running performance of the four wheel drive vehicle on rough road is not needed, it is possible to decrease the sizes of thrust bearings 23 and 25, to increase the design freedom of the roller frictional transmission unit, and to attain the size reduction and the weight reduction.

Second Embodiment

Figure 6:
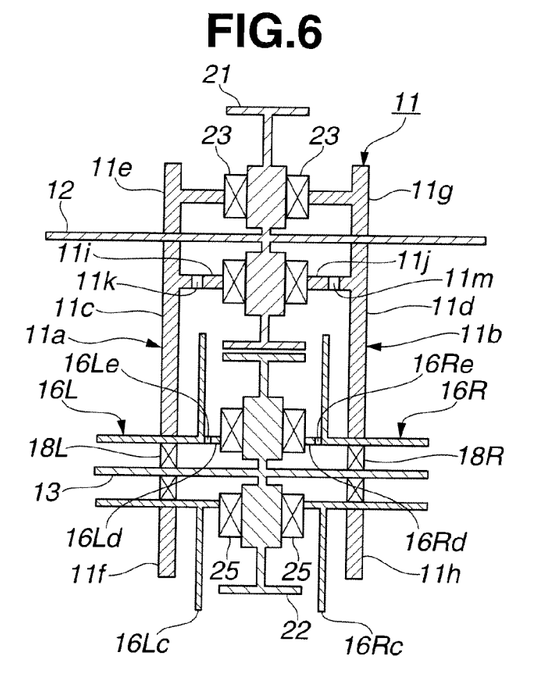
FIG. 6 is a schematic view showing a roller frictional transmission unit according to a second embodiment of the present invention.

FIG. 6 is a schematic diagram showing a roller frictional transmission unit according to a second embodiment of the present invention. The roller frictional transmission unit of FIG. 6 is substantially identical to the apparatus of FIGS. 2 and 5 in most aspects as shown by the use of the same reference numerals. Hereinafter, only different parts are illustrated.

In the roller frictional transmission unit according to the second embodiment, the following countermeasure is provided in place of thrust buffering members 31 and 32 in the first embodiment. That is, hollow portions 11k and 11m such as a slit which is a clearance in the thrust direction are formed, respectively, in thrust bearing support portions 11i and 11j of unit housing side walls 11a and 11b which constitute the thrust transmission paths to thrust bearings 23. With this, the low rigidity structures for buffering the thrust are disposed, respectively, in the thrust transmission paths to thrust bearings 23.

However, hollow portions 11k and 11m are provided, respectively, only in the circumferential regions of thrust bearings 23 which receive the thrust in the compression direction by the above-described deformation of unit housing 11 when rollers 21 and 22 are pressed and contacted with each other in the radial direction. Hollow portions 11k and 11m are substantially semi-circular hollow portions which do not extend to the other circumference region.

Moreover, hollow portions 16Le and 16Re such as a slit which is a clearance in the thrust direction are formed, respectively, in thrust bearing support portions 16Ld and 16Rd of crank shafts 16L and 16R which constitute the thrust transmission paths to thrust bearings 25. With this, the low rigidity structures for buffering the thrust are disposed, respectively, in the thrust transmission paths to thrust bearings 25.

However, hollow portions 16Le and 16Re are provided, respectively, only in the circumferential regions of thrust bearing 25 which receive the thrust in the compression direction by the above-described deformation of unit housing 11 when rollers 21 and 22 are pressed and contacted with each other in the radial direction. Hollow portions 16Le and 16Re are substantially semi-circular hollow portions which do not extend to the other circumference region.

<Operations and Effects of Second Embodiment>

Figures 7A, 7B:
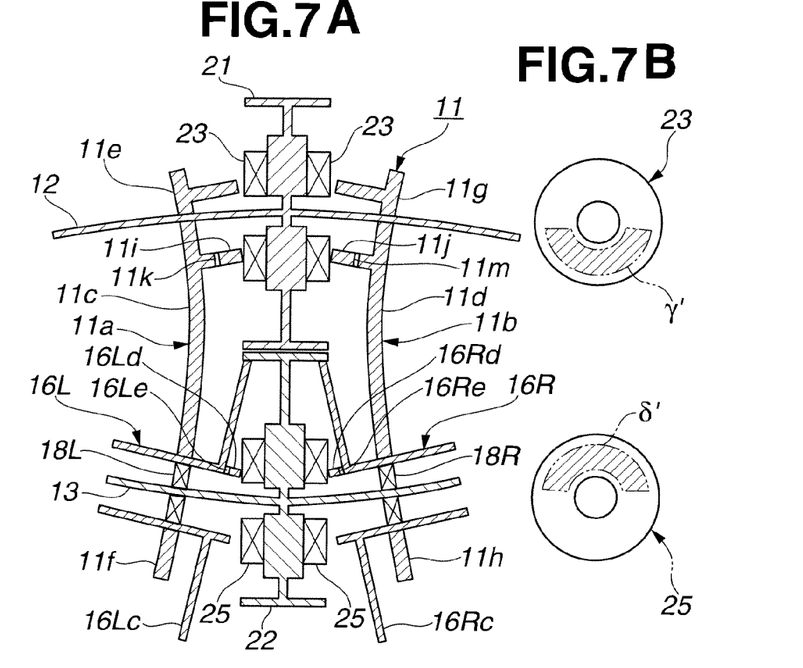

In the roller frictional transmission unit according to the second embodiment, even when unit housing side walls 11a and 11b are deformed as shown in FIG. 7A by the cause described above with reference to FIG. 4A, the thrust load to thrust bearings 23 and 25 are buffered and dispersed by hollow portions 11k and 11m, and 16Le and 16Re (the low rigidity structure for buffering the thrust). The areas of the circumference regions of thrust bearings 23 and 25 to which the thrust load are applied are $\gamma'$ and $\delta'$ as shown in FIG. 7B, and are not the small areas $\gamma$ and $\delta$ of the conventional apparatus as shown in FIG. 4B.

Accordingly, it is possible to decrease the contact pressures of thrust bearings 23 and 25 by the thrust load relative to the conventional apparatus, and to improve the durability of thrust bearings 23 and 25. Moreover, it is possible to attain the above-described effects without the weight increase and the cost increase of the roller frictional transmission unit since the slit-shaped hollow portions 11k and 11m are merely formed in thrust bearing support portions 11i and 11j of unit housing side walls 11a and 11b, and the slit-shaped hollow portions 16Le and 16Re are merely formed in thrust bearing support portions 16Ld and 16Rd of crank shafts 16L and 16R.

Moreover, it is possible to increase the radial pressing force between the rollers without worrying about the durability of thrust bearings 23 and 25, thereby to increase the transmission torque capacity of the roller frictional transmission unit, and to improve the running performance of the four wheel drive vehicle on rough road (running through performance). Moreover, when the large running performance of the four wheel drive vehicle on rough road is not needed, it is possible to decrease the sizes of thrust bearings 23 and 25, to increase the design freedom of the roller frictional transmission unit, and to attain the size reduction and the weight reduction.

Third Embodiment

Figure 8:
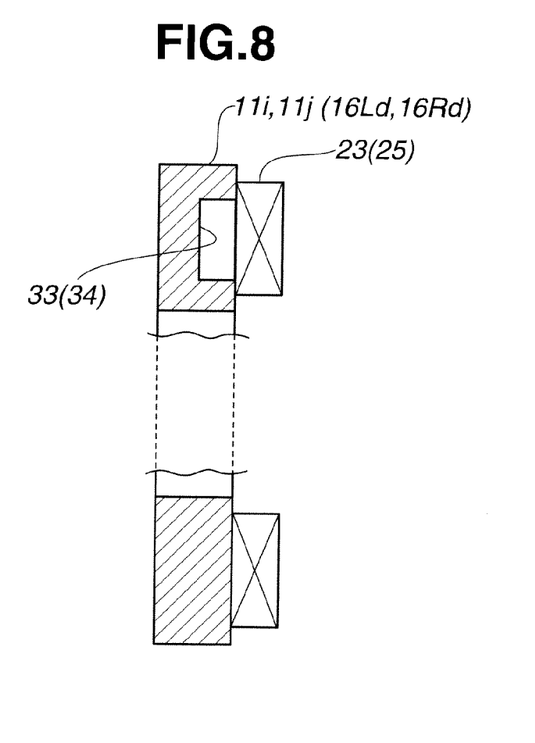
FIG. 8 is a longitudinal sectional side view showing, as a main part, a thrust bearing support portion of a roller frictional transmission unit according to a third embodiment of the present invention.

FIG. 8 is a schematic diagram showing support portions of thrust bearings 23 and 25 of a roller frictional transmission unit according to a third embodiment of the present invention. The roller frictional transmission unit of FIG. 8 is substantially identical to the apparatus of FIGS. 2, 5, and 6 in most aspects as shown by the use of the same reference numerals. Hereinafter, only different parts are illustrated.

In the roller frictional transmission unit according to the third embodiment, the following countermeasure is provided in place of thrust buffering members 31 and 32 in the first embodiment, and hollow portions 11k and 11m, and 16Le and 16Re of the thrust bearing support portions in the second embodiment. That is, recessed portions 33 in the thrust direction are formed in thrust bearing support portions 11i and 11j of unit housing side walls 11a and 11b which constitute the thrust transmission paths to thrust bearings 23, at ends of thrust bearing support portions 11i and 11j which are abutted on thrust bearings 23 in the thrust direction (in the thrust direction abutting portions between thrust bearing support portions 11i and 11j and thrust bearings 23). With this, the low rigidity structures for buffering the thrust are disposed, respectively, in the thrust transmission paths to thrust bearings 23.

Moreover, recessed portions 34 in the thrust direction are formed, respectively, in thrust bearing support portions 16Ld and 16Rd of crank shafts 16L and 16R which constitute the thrust transmission path to thrust bearings 25, at ends of thrust bearing support portions 16Ld and 16Rd which are abutted on thrust bearings 25 in the thrust direction (in the thrust direction abutting portions between thrust bearing support portions 16Ld and 16Rd and thrust bearings 25). With this, the low rigidity structures for buffering the thrust are disposed, respectively, in the thrust transmission paths to thrust bearings 25.

However, recessed portions 33 and 34 are provided only in the circumferential regions of thrust bearings 23 and 25 which receive the thrust in the compression direction by the above-described deformation of unit housing 11 when rollers 21 and 22 are pressed and contacted with each other in the radial direction. Recessed portions 33 and 34 are substantially semi-circular recessed portions which do not extend to the other circumference region.

<Operations and Effects of Third Embodiment>

In the roller frictional transmission unit according to the third embodiment, even when unit housing side walls 11a and 11b are deformed by the cause described above with reference to FIG. 4A, the thrust load to thrust bearings 23 and 25 are buffered and dispersed by recessed portions 33 and 34 (the low rigidity structure for buffering the thrust). Accordingly, the areas of the circumference regions of thrust bearings 23 and 25 to which the thrust load are applied can be increased like $\gamma'$ and $\delta'$ as shown in FIGS. 5B and 7B.

Therefore, it is possible to decrease the contact pressures of thrust bearings 23 and 25 by the thrust load relative to the conventional apparatus, and to improve the durability of thrust bearings 23 and 25. Moreover, it is possible to attain the above-described effects without the weight increase and the cost increase of the roller frictional transmission unit since recessed portions 33 and 34 are merely formed in thrust bearing support portions 11i and 11j, and thrust bearing support portion 16Ld and 16Rd.

Moreover, it is possible to increase the radial pressing force between the rollers without worrying about the durability of thrust bearings 23 and 25, thereby to increase the transmission torque capacity of the roller frictional transmission unit, and to improve the running performance of the four wheel drive vehicle on rough road (running through performance). Moreover, when the large running performance of the four wheel drive vehicle on rough road is not needed, it is possible to decrease the sizes of thrust bearings 23 and 25, to increase the design freedom of the roller frictional transmission unit, and to attain the size reduction and the weight reduction.

Other Embodiments

In the first embodiment, as shown in FIG. 2 and FIG. 5A, thrust buffering members 31 are disposed, respectively, in the thrust direction abutting portion between thrust bearing 23 and first roller 21, and thrust buffering members 32 are disposed, respectively, in the thrust direction abutting portions between thrust bearings 25 and second roller 22. Moreover, thrust buffering members 31 and 32 may be disposed on opposite sides of the thrust bearings 23 and 25 in the axial direction. Moreover, thrust buffering members 31 and 32 may be disposed on both sides of thrust bearings 23 and 25.

In the roller frictional transmission unit according to the first to third embodiments, the thrust contact pressure decreasing countermeasures are provided to thrust bearing 23 on the input roller side, and thrust bearing 25 on the output roller side. Moreover, the thrust contact pressure decreasing countermeasure may be provided only to one of thrust bearings 23 and 25 which needs this countermeasure.

A roller frictional transmission unit according to the present invention includes: a first roller; a second roller having an outer circumference surface arranged to be pressed and contacted with an outer circumference surface of the first roller to transmit a power between the first roller and the second roller by a friction; an input shaft connected with a driving system of main driving wheels of a four wheel drive vehicle, and connected with one of the first roller and the second roller; an output shaft connected with a driving system of auxiliary driving wheels of the four wheel drive vehicle, and connected with the other of the first roller and the second roller; a thrust bearing arranged to position an input shaft side rotation section including the one of the first roller and the second roller and the input shaft, or an output shaft side rotation section including the other of the first roller and the second roller and the output shaft, with respect to a unit housing in an axial direction; and a low rigidity structure disposed in a thrust transmission path to the thrust bearing, and arranged to buffer a thrust.

In this way, the roller frictional transmission unit according to the present invention, the low rigidity structure for buffering the thrust is disposed in the thrust transmission path to the thrust bearing. Accordingly, the low rigidity structure buffers and disperse the thrust load to the thrust bearing. Even when the side wall of the unit housing is deformed by the curvature of the input shaft and/or the output shaft by the radial pressing reaction force between the rollers, the area of the circumferential region of the thrust bearing which receives the thrust load becomes large relative to the conventional apparatus.

Accordingly, it is possible to decrease the contact pressure of the thrust bearing by the thrust load, and to solve the problem to decrease the durability of the thrust bearing.

The entire contents of Japanese Patent Application No. 2010-274249 filed Dec. 9, 2010 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A roller frictional transmission unit comprising:
a first roller;
a second roller having an outer circumference surface arranged to be pressed and contacted with an outer circumference surface of the first roller to transmit a power between the first roller and the second roller by a friction;
an input shaft connected with a driving system of main driving wheels of a four wheel drive vehicle, and connected with one of the first roller and the second roller;
an output shaft connected with a driving system of auxiliary driving wheels of the four wheel drive vehicle, and connected with the other of the first roller and the second roller;
a thrust bearing arranged to position an input shaft side rotation section including the one of the first roller and the second roller and the input shaft, or an output shaft side rotation section including the other of the first roller and the second roller and the output shaft, with respect to a unit housing in an axial direction; and
a low rigidity structure disposed in a thrust transmission path to the thrust bearing, and arranged to buffer a thrust.

2. The roller frictional transmission unit as claimed in claim 1, wherein the thrust transmission path in which the low rigidity structure is disposed is a thrust transmission path to a circumferential region of the thrust bearing which receives the thrust in a compression direction by a deformation of the unit housing when the first roller and the second roller are pressed and contacted with each other in a radial direction.

3. The roller frictional transmission unit as claimed in claim 1, wherein the low rigidity structure is a thrust buffering member disposed on one side of the thrust bearing in the axial direction.

4. The roller frictional transmission unit as claimed in claim 1, wherein the low rigidity structure is a hollow portion formed in a thrust bearing support portion which is the thrust transmission path.

5. The roller frictional transmission unit as claimed in claim 1, wherein the low rigidity structure is a recessed portion which is formed in a thrust bearing support portion which is the thrust transmission path; and the recessed portion is formed in a thrust direction at an end of the thrust bearing support portion which is abutted on the thrust bearing in the thrust direction.

* * * * *